April 19, 1932. J. A. ALMQUIST 1,855,040
PROCESS AND APPARATUS FOR CATALYTIC GASEOUS REACTIONS Filed Dec. 31, 1928

John A. Almquist Inventor

By his Attorney
W. R. Gawthrop.

Patented Apr. 19, 1932

1,855,040

UNITED STATES PATENT OFFICE

JOHN A. ALMQUIST, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS AND APPARATUS FOR CATALYTIC GASEOUS REACTIONS

Application filed December 31, 1928. Serial No. 329,623.

This invention relates to methods of and apparatus for effecting catalytic exothermic gaseous reactions under pressure.

It is generally recognized that in order to obtain the most satisfactory results in conducting catalytic gaseous reactions care should be taken that the gases employed do not contain any catalyst poisons, that is, substances tending to decrease the activity of the catalyst. In the case of some gaseous reactions the usual source of the gases is such that they are likely to be contaminated with catalyst poisons, the removal of the last traces of which is extremely difficult. In certain cases of this character it has been found that the complete elimination of these difficultly removable impurities can be accomplished by contacting the gases directly before delivery to the catalyst for the main reaction with a body of contact material, hereinafter referred to as a "purifier catalyst", this being a material adapted to absorb the poisons and/or to convert them into substances that can be relatively readily removed from the gases. For instance, in the synthesis of ammonia from a gaseous mixture of nitrogen and hydrogen contaminated with small amounts of carbon monoxide the last traces of the latter can be removed by passage of the gaseous mixture over a methanating catalyst, by means of which the carbon monoxide is caused to react with hydrogen to form methane and water. Such small amounts of methane as are produced have little or no effect upon the ammonia synthesis and the water produced can be condensed or otherwise removed from the gases before delivery thereof to the ammonia catalyst. Similarly, in the synthesis of liquefiable organic compounds from carbon monoxide and hydrogen and in the production of hydrogen by the reaction of steam and carbon monoxide, the elimination of very difficultly removable organic compounds of sulphur may be necessary before the gases are submitted to catalysis. This final purification may advantageously be effected by passage of the gaseous mixture over a catalyst that will convert the organic sulphur compounds into hydrogen sulphide, which may then without difficulty be removed by absorption in alkaline reagents before the gases are passed over the catalyst for the main reaction. Or the purifier catalyst may be a material adapted not only to convert the organic sulphur compounds into hydrogen sulphide but also to absorb the latter together with any hydrogen sulphide originally present.

A common characteristic of these methods of final gas purification is that, generally speaking, it is necessary that the contact mass employed for the purpose be maintained at a somewhat elevated temperature. In view of the fact that this type of purification involves the removal of only relatively small quantities of impurities, the amount of heat that may be developed by the purification reaction is only slight as compared with the amount required to raise the whole body of gas to the temperature at which it is to contact with the purifier catalyst. The heat of reaction is usually so small, in fact, that it does not give sufficient temperature rise to make heat interchange between exit and inlet gases feasible unless said temperature rise is greatly augmented by heat supplied from some other source. The prior method of effecting this final purification has, therefore, not only involved the use of a purifier converter separate from the producer converter but has also required suitable heating means for providing the necessary purifier catalyst temperature. In the case of reactions that are effected under high pressures the final cost of the products is in large part determined by the number and size of the pressure-resisting reaction vessels employed and consequently the necessity for using a separate and independently heated and controlled purification apparatus may represent a considerable item of expense.

At the same time it is recognized that in gaseous exothermic reactions as hitherto conducted there has frequently been a considerable waste because of failure to utilize with a high degree of efficiency the heat developed by the reaction.

It is the object of the present invention to provide an improved process of and apparatus for effecting catalytic exothermic gaseous reactions under pressure and the final purification of the gases employed in such reactions, the invention being particularly characterized by improvements that make possible a simplified operation and control and an improved overall thermal efficiency, and otherwise contribute to a greater economy in the process.

Other objects and advantages of the invention will be apparent as it is better understood by reference to the following specification and to the accompanying drawings in which—

Figure 1:
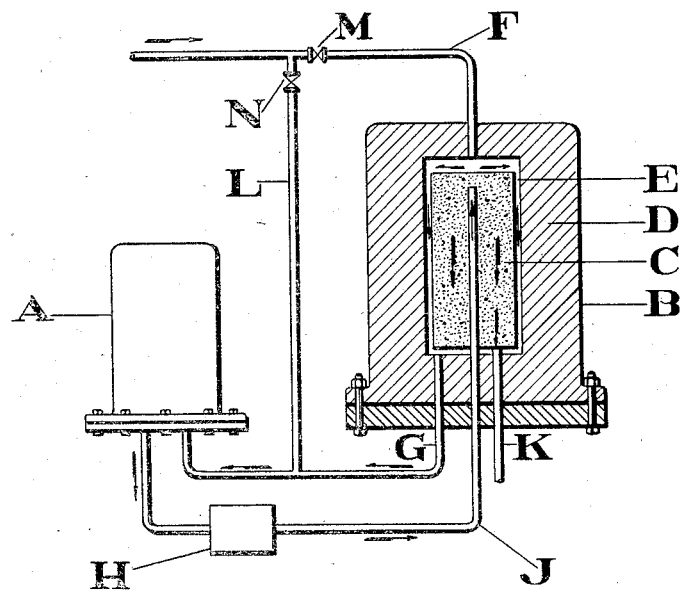
Figure 1 is a diagrammatic representation of one arrangement of apparatus suitable for use in the practice of the invention and—

In accordance with the present invention, where separate purifier and producer catalyst tubes are used, the relatively cool compressed gases going to the purifier catalyst are passed in heat exchange relation to but out of direct contact with the producer catalyst, for example by passage between the body of producer catalyst and the pressure-sustaining wall enclosing it. By this means the gases acquire the temperature necessary for the functioning of the purifier catalyst and simultaneously the pressure-sustaining wall enclosing the producer catalyst is protected from the heat thereof. The thus warmed gases are conducted over the purifier catalyst and in contact therewith the desired purification reaction is effected. Before delivery to the producer catalyst the gases may then be treated for removal of products of the purification reaction and the temperature of the gases may be adjusted, for example, by heat exchange with the hot gases leaving the producer catalyst. By this procedure the necessity for supplying heat from an external source to warm the purifier catalyst is eliminated. At the same time, since the maximum temperature at which the compressed gases can safely be handled after and while using them to cool the pressure-sustaining wall is generally in excess of that required for operation of the purifier catalyst, it is possible by the provision of a suitable arrangement of apparatus to make the purification reaction not only thermally self-sustaining but quite easy of control. For instance, if the apparatus is designed so that the temperature attained by the gases in cooling the pressure-sustaining wall surrounding the producer catalyst is normally somewhat in excess of that required for the purifier catalyst, a certain amount of the gases may be sent direct to the purifier catalyst without contacting them with the producer tube pressure-sustaining wall and such occasional regulation of the temperature of the purifier catalyst as is found necessary may be effected by varying the proportion of gases so by-passed.

It will be apparent that the present invention presents a distinct improvement over the prior method of conducting the final purification, which involved the provision of independent heating and temperature control means and took no account of the considerable amounts of heat present in and necessary to be removed from the producer tube. In the process herein described the heat available from the main reaction, and which must be removed to afford the necessary protection for the pressure-sustaining wall, is efficiently utilized to provide the required temperature for the purifier catalyst, with a considerable increase in the economy of the process and also an improvement in the simplicity of operation and control.

As a further feature of the invention I have discovered that the foregoing principle may be applied with particular advantage by disposing the purifier catalyst within the pressure-sustaining wall that encloses the producer catalyst. This arrangement eliminates the need for a separate pressure-sustaining vessel for the purification operation, thereby reducing the cost of equipment, and at the same time simplifies the operation and control of the process and improves the thermal efficiency thereof. For by disposing the catalyst in juxtaposition to, and within the same apparatus as, the producer catalyst a more efficient utilization of the heat of the main reaction in supplying the temperature required for the purifier catalyst is attained. It will be seen that thereby the purifier catalyst can be warmed not only by the gas stream that has previously contacted with the hot pressure-sustaining wall but also by direct transfer of heat from the hot producer catalyst. This transfer of heat may be effected with particular advantage if the purifier catalyst is disposed in heat exchange relation to the producer catalyst, for example, within a reaction chamber surrounded by the compartment containing the producer catalyst. Where this modification of the invention is employed it is also found advantageous to utilize a form of apparatus which makes possible the withdrawal of the gases therefrom after they have contacted with the purifier catalyst so that they may be subjected to such further treatment as may be desired before delivering them to the producer catalyst. This treatment will in most cases consist in eliminating those products of the purification reaction which should be removed, as, for example, by condensation of liquefiable compounds or by absorption of the products by suitable reagents. At the same time, or alternatively, the gases, having been withdrawn from the main apparatus, may be conveniently subjected to such regulation of temperature as is desired before bringing them into contact with the producer catalyst.

Figure 2:
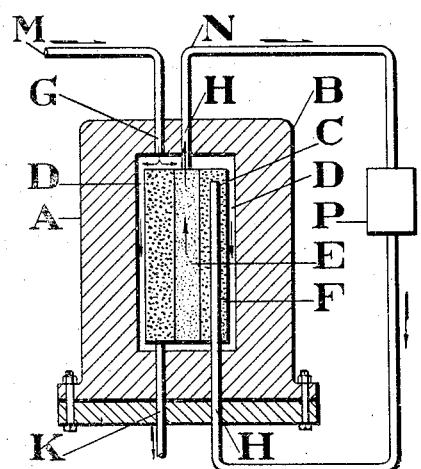
Figure 2 illustrates another form of apparatus.

The objects and advantages of the invention hereinbefore referred to and others obvious to those skilled in the art will be made more clear by the following description and the drawing in which Figures 1 and 2 represent diagrammatically two forms of apparatus adapted for use in the practice of the invention.

Referring to Figure 1 of the drawings, the principal features of the apparatus are two pressure-resisting reaction vessels, A and B, the former containing the purifier catalyst and the latter the producer catalyst. The producer catalyst is disposed in a catalyst container C surrounded by a pressure-sustaining wall D spaced therefrom and thus forming an annular gas passage E. The compressed gases that are to react are delivered to the apparatus B through the inlet F whence they flow through the passage E wherein they are warmed by the heat of the reaction taking place in C and at the same time they protect the wall D from the heat of the reaction. The gases thus heated are withdrawn from B at G and are conducted thence to the purifier tube A in which they contact with the purifier catalyst disposed therein. From A the gases are delivered to H which represents gas regulating means employed for removal of the products of the purification reaction and/or for adjusting the temperature of the gases before delivery thereof to the producer catalyst in C by way of the inlet J. The gases which have reacted in C are withdrawn through the outlet K and after separation of the desired products the unreacted gases, together with fresh gases, may be returned to the same or a similar apparatus for further treatment.

By provision of a by-pass conduit L with valves M and N a portion of the gases, instead of being conducted through the passage E, may be delivered direct to the purifier catalyst. This arrangement is useful in starting the operation of the apparatus and also in taking care of emergencies where it is desired to pass more or less than the normal amount of gases through the passage E before delivery thereof to the purifier catalyst.

Figure 2 represents diagrammatically a modified arrangement of apparatus in which the producer catalyst and the purifier catalyst are disposed within the same pressure-sustaining wall and in fact are in heat exchange relation to one another.

Referring to Figure 2, A represents a cylindrical catalytic converter comprising a pressure-sustaining wall B enclosing a reaction chamber C spaced from the wall to form an annular gas passage D. The reaction chamber consists of two compartments—an inner, E, containing the purifier catalyst; and an outer, F, containing the producer catalyst. Gas inlets G and H, and outlets K and N are provided. A conduit M leads to the converter A from a source of compressed gases for the reaction and conduits N and O connect it with a separate gas regulating means P in which the gases after contacting with the purifier catalyst may be treated before delivery to the producer catalyst.

In employing the apparatus the compressed gases, containing small amounts of impurities, are delivered by the conduit M to the reaction apparatus entering the latter through the inlet G. Thence they flow through the annular gas passage D wherein they protect the wall B from the heat of the reaction and at the same time are warmed. Thus heated the gases are passed over the purifier catalyst E. The resulting gaseous mixture is withdrawn from the apparatus by way of the outlet H and is delivered through the conduit N to the apparatus P. Here the compressed gases are cooled, and subjected to such treatment as is desirable before effecting the main reaction; the products of the purification reaction may be removed and/or the temperature of the gases may be adjusted, for example. The purified gases are then returned through the conduit O to the apparatus A which they reenter through the inlet H. Thence the gases are delivered to the producer catalyst. The gases leave the apparatus at K and are treated, in apparatus not shown, for removal of the products. The residual gases may, if desired, be mixed with fresh compressed gases and returned to the same or a similar apparatus for further reaction.

It will be understood that the invention is not limited to the use of any particular substance or substances as purifier catalyst or producer catalyst, it being obvious that the specific nature of the catalyst will depend upon the reaction to which the invention is applied, the character and quantity of the impurities in the gases and other considerations. For example, in the synthesis of ammonia from a gaseous mixture of nitrogen and hydrogen containing traces of carbon monoxide, the producer catalyst may be a mixture of iron, potassium oxide and aluminum oxide, while the purifier catalyst may be a mixture of cobalt and magnesium oxide or, indeed, it may actually have the same or substantially the same composition as the ammonia forming catalyst. On the other hand, in the synthesis of methanol and the like from a mixture of carbon monoxide and hydrogen containing organic sulphur compounds, the producer catalyst may be a mixture of zinc and chromium oxides and the purifier catalyst a mixture of copper and zinc oxide.

From the foregoing description the general principle of the invention and the manner of the practical application thereof will be apparent and it will be obvious to those skilled in the art that the process and apparatus described may be applied with advantage in carrying out many gaseous reactions including those hereinbefore specifically referred to and others not mentioned.

Various changes may be made in the method and apparatus described without departing from the invention or sacrificing any of the advantages thereof.

I claim:

In an apparatus for effecting catalytic exothermic gaseous reactions under pressure the combination of a purifier catalyst chamber and a producer catalyst chamber surrounded by separate pressure-sustaining walls, the pressure-sustaining wall surrounding said producer catalyst chamber being spaced therefrom to form an annular gas passage; means to deliver compressed gases to said passage and means to convey the gases therefrom to the purifier catalyst chamber and means to return the gases from the purifier catalyst chamber to the producer catalyst chamber.

In testimony whereof, I affix my signature.

JOHN A. ALMQUIST.